(12) United States Patent
Takahashi et al.

(10) Patent No.: US 11,841,598 B2
(45) Date of Patent: Dec. 12, 2023

(54) OPTICAL MODULATOR

(71) Applicant: Nippon Telegraph and Telephone Corporation, Tokyo (JP)

(72) Inventors: Masayuki Takahashi, Musashino (JP); Ken Tsuzuki, Musashino (JP); Toshihiro Ito, Musashino (JP); Kiyofumi Kikuchi, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 321 days.

(21) Appl. No.: 17/429,268

(22) PCT Filed: Feb. 7, 2020

(86) PCT No.: PCT/JP2020/004954
§ 371 (c)(1),
(2) Date: Aug. 6, 2021

(87) PCT Pub. No.: WO2020/170871
PCT Pub. Date: Aug. 27, 2020

(65) Prior Publication Data
US 2022/0137478 A1    May 5, 2022

(30) Foreign Application Priority Data
Feb. 19, 2019   (JP) .................. 2019-027712

(51) Int. Cl.
*G02F 1/21*    (2006.01)
*G02F 1/015*   (2006.01)
(Continued)

(52) U.S. Cl.
CPC .............. *G02F 1/212* (2021.01); *G02F 1/015* (2013.01); *G02F 1/025* (2013.01); *G02F 1/2257* (2013.01); *G02F 2201/127* (2013.01)

(58) Field of Classification Search
CPC ........ G02F 1/212; G02F 1/2257; G02F 1/225; G02F 1/2255; G02F 1/025; G02F 2201/127; G02F 1/015
See application file for complete search history.

(56) References Cited

U.S. PATENT DOCUMENTS 10,630,389 B2 *   4/2020   Makino ................ H04B 10/516
11,275,261 B2 *   3/2022   Takahashi ............... G02F 1/025
(Continued)

FOREIGN PATENT DOCUMENTS

JP    2003-530592 A    10/2003
JP    2004-102160 A     4/2004
(Continued)

OTHER PUBLICATIONS

David Patel et al., *Design, Analysis, and Transmission System Performance of a 41 GHz Silicon Photonic Modulator*, Optics Express, vol. 23, No. 11, 2015, pp. 14263-14275.
(Continued)

*Primary Examiner* — Michelle R Connelly
(74) *Attorney, Agent, or Firm* — Workman Nydegger

(57) ABSTRACT

A optical modulator with reduced with a reduced amount of ripple is provided. A Mach-Zehnder optical modulator includes a phase modulation unit including optical waveguides having a PN junction structure and traveling wave electrodes, and a dummy phase modulation unit including portions of the traveling wave electrodes, the portions being obtained by forming the respective traveling wave electrodes longer than the phase modulation unit in the light propagation direction of the phase modulation unit, and optical waveguides having the same PN junction structure as that of the optical waveguides of the phase modulation unit and not connected to the optical waveguides of the phase modulation unit.

7 Claims, 11 Drawing Sheets

(51) Int. Cl.
  *G02F 1/025* (2006.01)
  *G02F 1/225* (2006.01)

(56) References Cited

U.S. PATENT DOCUMENTS

| | | | |
|---|---|---|---|
| 11,340,478 B2* | 5/2022 | Ito | G02F 1/025 |
| 2003/0190107 A1 | 10/2003 | Walker | |
| 2004/0052491 A1 | 3/2004 | Otake et al. | |
| 2014/0233878 A1* | 8/2014 | Goi | G02B 6/122 |
| | | | 385/14 |
| 2017/0336696 A1* | 11/2017 | Tsuzuki | G02F 1/2257 |
| 2018/0180965 A1* | 6/2018 | Goi | G02F 1/2255 |
| 2018/0239176 A1* | 8/2018 | Tsuzuki | G02F 1/025 |
| 2019/0025615 A1 | 1/2019 | Kawamura et al. | |
| 2023/0102304 A1* | 3/2023 | Latrasse | G02F 1/025 |
| | | | 385/2 |

FOREIGN PATENT DOCUMENTS

| | | | | |
|---|---|---|---|---|
| JP | 2011-197427 A | | 10/2011 | |
| JP | 2015-148711 A | | 8/2015 | |
| WO | WO-2014104309 A1 | * | 7/2014 | ......... G02B 6/29353 |
| WO | 2017/159782 A1 | | 9/2017 | |

OTHER PUBLICATIONS

N. Wolf et al., *Electro-Optical Co-Design to Minimize Power Consumption of a 32 GBd Optical IQ- Transmitter Using InP MZ-Modulators*, 2015 IEEE Compound Semiconductor Integrated Circuit Symposium (CSICS), Oct. 11, 2015, https://ieeexplore.ieee.org/document/7314499, pp. 1-5.

* cited by examiner

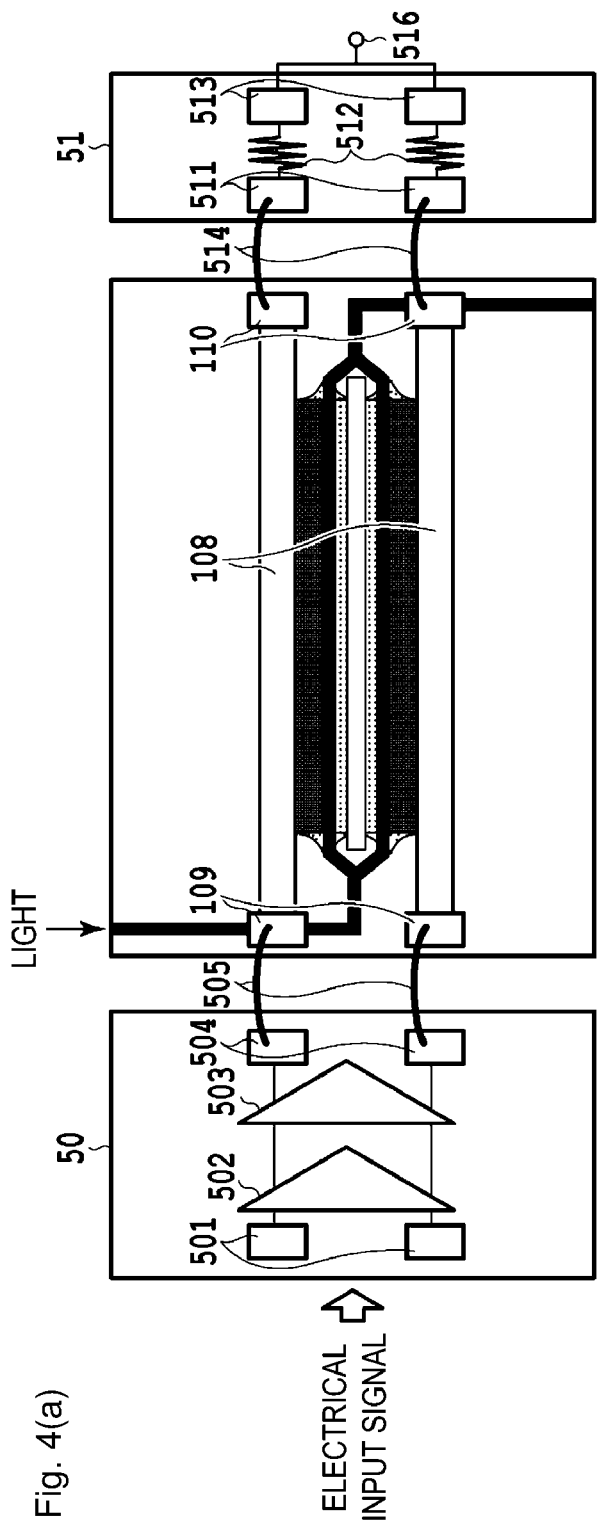
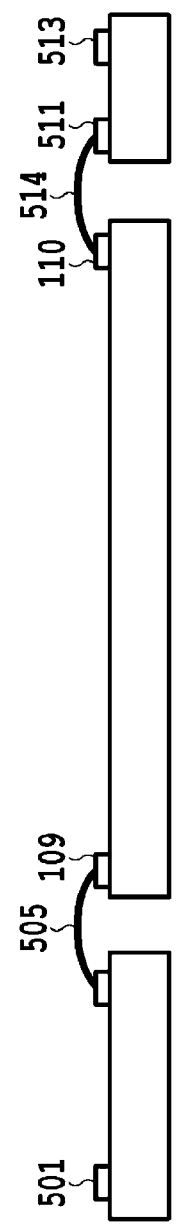
Fig. 4(a)
Fig. 4(b)

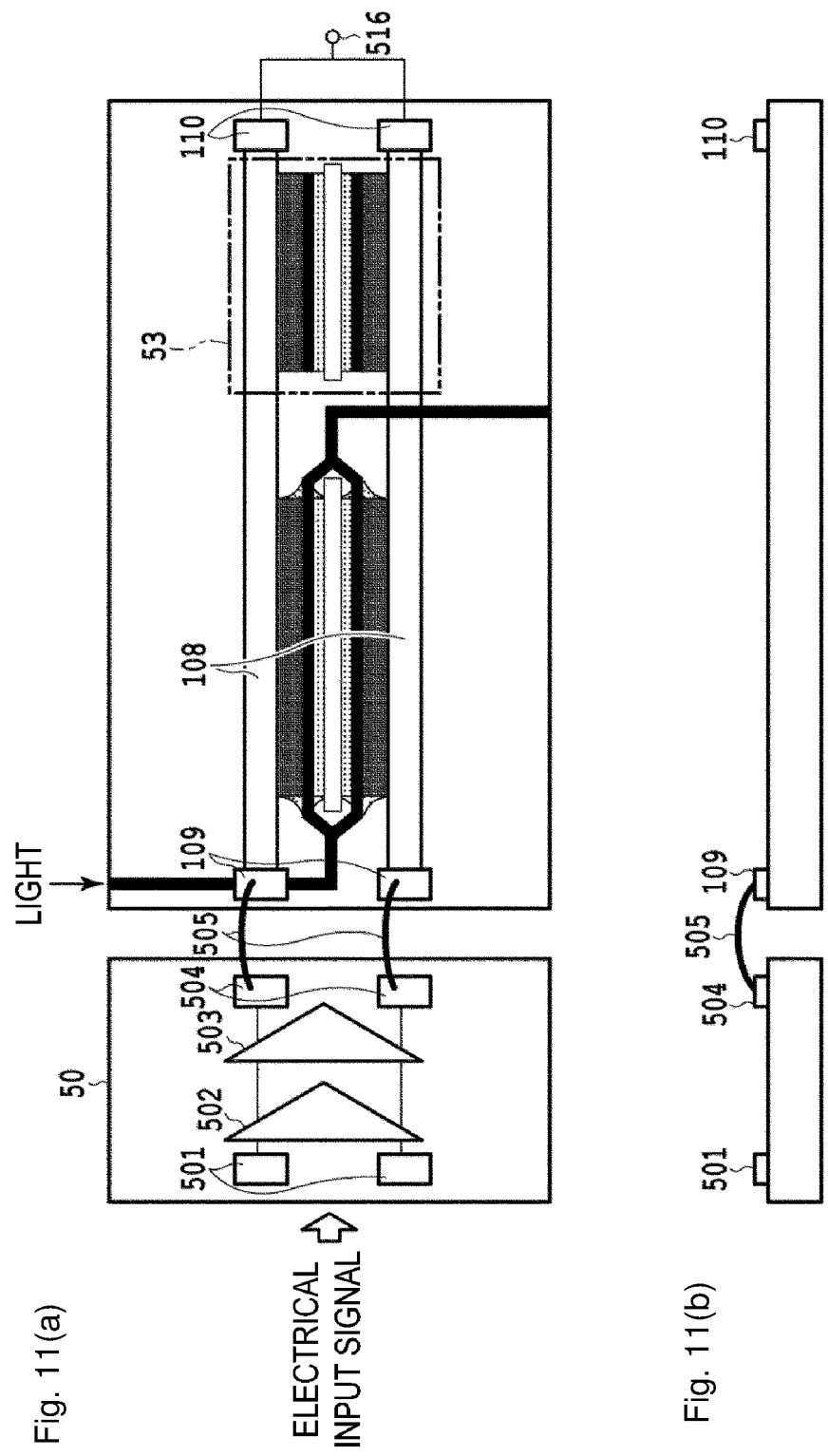

OPTICAL MODULATOR

TECHNICAL FIELD

The present disclosure relates to an optical modulator, and more particularly to an optical modulator capable of high-quality modulation of an optical transmission signal.

BACKGROUND ART

With the explosive development of Internet-based services, expectations for increased capacity and lower power consumption of optical communications to support the services has been increasing. An optical modulator that transmits an optical signal is necessary for optical communication.

A Mach-Zehnder optical modulator has a structure in which light incident on an optical waveguide on an input side is split into beams in two optical waveguides (arm optical waveguides) at an intensity of 1:1, the light beams resulting from the splitting are propagated for a certain length, and then combined again and output. Phase modulation units provided in the two branched optical waveguides change the phases of the two light beams, thereby changing the interference condition of light when the light beams are multiplexed. This can modulate the intensity and phase of the output light. The Mach-Zehnder optical modulator is widely used for medium and long distance optical communication of a metro-to-metro distance or more because of its small wavelength dependency, no wavelength chirp component in principle, and high speed.

A dielectric such as $LiNbO_3$ or a semiconductor such as InP, GaAs, and silicon (Si) is used as the material forming the optical waveguides of the phase modulation unit, and modulated electrical signals are input to electrodes disposed near these optical waveguides and a voltage is applied to the optical waveguides, thereby changing the phase of the light propagating in the optical waveguides. In particular, when Si is used for an optical waveguide, in addition to the Mach-Zehnder optical modulator, a photodiode using germanium (Ge) that can be crystal-grown on a Si substrate, a directional coupler using a Si optical waveguide, and a passive optical circuit such as a Y-splitter can be collectively integrated. Thus, the size can be reduced by forming a device group required for transmission and reception in optical communication into a single chip, so that research and development has been actively performed for next generation optical transmitters, receivers, and optical transceivers.

For example, a Si optical modulator is formed from a Silicon on Insulator (SOI) substrate obtained by pasting a Si thin film on a Buried Oxide (BOX) layer obtained by thermally oxidizing the surface of a Si substrate. The Si optical modulator is manufactured by, for example, processing a Si thin film into a thin line such that light can be guided in an SOI layer, injecting dopants so as to form a p-type or n-type semiconductor, depositing $SiO_2$ serving as a light cladding layer, and forming electrodes. In this case, the optical waveguide needs to be designed and processed such that optical loss becomes small. In the p-type or n-type doping and formation of the electrodes, it is necessary to perform design and processing so as to suppress the loss of light and to suppress the reflection and loss of high-speed electrical signals.

FIG. 1 illustrates a cross-sectional structure diagram of an optical waveguide of an optical phase modulation unit having a lateral PN junction which is the basis of a Si optical modulator in the related art. In FIG. 1, light propagates in a direction perpendicular to the plane of the paper. The phase modulation unit of this Si optical modulator includes a Si layer 2 sandwiched between upper and lower $SiO_2$ cladding layers 1 and 3. A Si thin line for confining light in the center of FIG. 1 has a structure called a rib waveguide having a difference in thickness.

An optical waveguide 7 is configured in which a thick central portion of the Si layer 2 in FIG. 1 is used as a waveguide core 20, and a refractive index difference between the waveguide core 20 and the surrounding $SiO_2$ cladding layers 1 and 3 is used to confine light propagating in the direction perpendicular to the paper.

A high-concentration p-type semiconductor layer 22 and a high-concentration n-type semiconductor layer 23 are provided in the slab regions 21 on both sides of the optical waveguide 7. Furthermore, a pn junction structure formed by a medium-concentration p-type semiconductor layer 24 and a medium-concentration n-type semiconductor layer 25 is formed in the core center portion of the optical waveguide 7. A modulated electrical signal and a bias are applied from both of the right and left ends of FIG. 1. The pn junction structure formed by the medium-concentration p-type semiconductor layer 24 and the medium-concentration n-type semiconductor layer 25 may be a pin structure in which an i-type (intrinsic) semiconductor that is not doped is sandwiched between the layers 24 and 25.

Note that, although the same applies to the following description, commonly, one of a p-type semiconductor and a n-type semiconductor of a semiconductor device can be referred to as a region having a first polarity, and the other can be referred to as a region having a second polarity, regardless of concentration.

Although not illustrated in FIG. 1, metal electrodes (not illustrated) that contact the high-concentration semiconductor layer 22 and 23 on both ends are provided, and a radio frequency (RF) modulated electrical signal and a reverse bias electric field (right to left in FIG. 1) are applied to the pn junction portion from the metal electrodes. By this, the phase of light may be modulated by changing the carrier density inside the optical waveguide core 20 and changing the refractive index of the optical waveguide (carrier plasma effect).

The waveguide dimensions depend on the refractive indexes of the core/clad materials, and thus cannot be uniquely determined, but in an example of the rib-type silicon waveguide structure including the optical waveguide core 20 and the slab regions 21 on both sides as in FIG. 1, the waveguide includes a core having a width of approximately 400 to 600 (nm) and a height of approximately 150 to 300 (nm), and a slab having a thickness of approximately 50 to 200 (nm) and a length of about several mm.

High-speed optical modulators are needed to perform large capacity optical communication. Examples of a broadband Mach-Zehnder optical modulator with a bandwidth greater than or equal to 10 Gbps include a traveling wave electrode Mach-Zehnder optical modulator. The traveling wave electrode is an electrode for matching the speed of a modulated electrical signal (microwave, radio frequency signal) with the speed of light (light wave) propagating through the optical waveguide (phase speed matching) and interacting with the light while propagating the electrical signal. For example, Non Patent Literature 1 is a reported example of a Si Mach-Zehnder optical modulator using a traveling wave electrode having a length of about several millimeters.

FIG. 2 illustrates a typical traveling wave electrode Mach-Zehnder optical modulator. FIG. 3 illustrates a cross-sectional structure of the traveling wave electrode Mach-Zehnder optical modulator taken along a section line III-III' in FIG. 2. The traveling wave electrode Mach-Zehnder optical modulator includes an input optical coupler (or Y-splitter) 101, a pair of parallel first and second waveguides 102 and 103 into which a waveguide is bifurcated by the input optical coupler 101 and which guide input light beams, and an output optical coupler 104 that couples output light beams.

As described regarding the optical phase modulation unit described above with reference to FIG. 1, the waveguides 102 and 103 are rib waveguides and form an optical phase modulation unit separated in the vertical direction of the paper into a region 105 having a first polarity and a region 106 having a second polarity. Any of the region having the first polarity or the region having the second polarity of the phase modulation unit of each of the first waveguide 102 and the second waveguide 103 is formed in a region surrounded by the waveguides 102 and 103. FIG. 2 illustrates a case where the region 106 having the second polarity is formed in the region enclosed by the waveguides 102 and 103. On the other hand, the region 105 having the first polarity is formed opposite to the region 106 having the second polarity, with the light traveling direction of each phase modulation unit as an axis.

In the region 106 having the second polarity, a metal bias electrode 107 is provided. In each of the two regions 105 having the first polarity provided in the vertical direction of the paper, a traveling wave electrode 108 is provided.

In the case of Si optical modulator, the PN junction not in a reverse bias state deteriorates the modulation rate. Thus, a voltage causing the PN junction to be in a reverse bias state is applied to the metal bias electrode 107, regardless of the bias state of each of the pair of traveling wave electrodes 108. Then, a differential voltage is applied to the traveling wave electrode 108 as a radio frequency modulated electrical signal (RF signal) from the left of the paper to modulate light.

Typically, the traveling wave electrode 108 is provided with an input-side pad 109 for connecting an output signal from a driver for driving the modulator by wire bonding or the like. The traveling wave electrode 108 is provided with an output-side pad 110 for impedance matching and for connecting with a termination resistor for terminating a radio frequency signal.

FIG. 4 illustrates a connection diagram in which the driver 50, a termination resistor 51, and the Mach-Zehnder optical modulator are combined. The traveling wave electrodes 108 of the Mach-Zehnder optical modulator are connected to the terminal 516 (power supply potential) via the termination resistor 51. When the output impedance Rout of the driver 50, the characteristic impedance Z of the traveling wave electrode 108 of the optical modulator, and the resistance value Rterm of the termination resistor 51 are equal to each other, impedance matching is achieved, signals output from the driver 50 are terminated at the termination resistor 51 without reflection, and the best radio frequency characteristics of the optical modulator can be expected. Thus, in general, the values of Rout, Z, and Rterm are designed to be equal to each other.

CITATION LIST

Non Patent Literature

Non Patent Literature 1: David Patel, Samir Ghosh, Mathieu Chagnon, Alireza Samani, Venkat Veerasubramanian, Mohamed Osman, and David V. Plant, "Design, analysis, and transmission system performance of a 41 GHz silicon photonic modulator", Opt. Express vol. 23, no. 11, pp. 14263-14275, 2015.

SUMMARY OF THE INVENTION

Technical Problem

In FIG. 4, when the Mach-Zehnder optical modulator and the values of Rout, Z, and Rterm are different from each other, impedance matching is not achieved, so that the radio frequency characteristics of the Mach-Zehnder optical modulator deteriorate. For example, Rout depends on the design of the driver, and Z depends on the design of the modulator, but Rout and Z may be different due to the size constraints when the driver and the Mach-Zehnder optical modulator are required to be miniaturized, or due to maximization of each characteristic. In addition, Rterm may deviate from the ideal value due to process variation or variation of each member. Further, Z generally has frequency characteristics, so that it is practically impossible to achieve design of making Rout, Z, and Rterm equal to each other at all frequencies.

FIG. 5 illustrates the EO (optical output) characteristics of the Mach-Zehnder optical modulator when the values of Rout, Z, and Rterm are changed. FIG. 5 illustrates a case where the value of Rterm is the same as the value of Z, and cases where the value of Rterm is changed from Z by ±5 and ±10 ohm, when Rout is approximately 150 ohm higher than Z. It can be seen that the frequency characteristics have larger ripples as the mismatch between Rout, Z, and Rterm increases. In a case where the optical modulation is performed using such a Mach-Zehnder optical modulator having characteristics in which ripples are large, the quality of transmitted signals deteriorates. Thus, a design needs to be made to minimize the ripples, but for the reasons described above, it is difficult to completely eliminate the ripples.

In particular, in the case of an open collector type driver or an open drain type driver, which does not have an output resistance of the driver and does not perform impedance matching with the Mach-Zehnder optical modulator, a reflected signal generated due to the mismatch between Z and Rterm is reflected at the output end of the driver with almost no attenuation, so that a slight discrepancy between Z and Rterm tends to increase the amount of ripple, resulting in degradation of the quality of transmission signals.

The present disclosure has been made in light of the problem, and an object of the present disclosure is to provide an optical modulator with a reduced amount of ripple, without affecting modulation characteristics.

Means for Solving the Problem

To achieve such an object, an aspect of the present disclosure is an optical modulator formed on a substrate, including at least one optical input, at least one optical output, and at least one phase modulation unit. In the optical phase modulator according to an embodiment, the phase modulation unit includes optical waveguides having a PN junction structure, and traveling wave electrodes, each of the traveling wave electrodes being configured to allow a radio frequency signal for modulation to be applied thereto and interact with a light beam propagating through a corresponding one of the optical waveguides while the light beam is propagating in a same direction, and the traveling wave electrodes are formed longer than the phase modulation unit in a light propagation direction of the phase modulation unit to constitute an attenuation region. The attenuation region is a dummy phase modulation unit, and the dummy phase modulation unit includes portions of the traveling wave electrodes, the portions being obtained by forming the respective traveling wave electrodes longer than the phase modulation unit, and optical waveguides having a same PN junction structure as that of the optical waveguides of the phase modulation unit and not connected to the optical waveguides of the phase modulation unit.

Another aspect of the present disclosure is an optical transmitter including the optical modulator.

Effects of the Invention

As described above, according to the present disclosure, due to the structure of the traveling wave electrodes of the optical modulator, the region for reducing ripples is provided, so that it is possible to reduce only the amount of ripple and improve the quality of transmission signals, without causing degradation of the EO bandwidth characteristics and deterioration of the optical output intensity.

BRIEF DESCRIPTION OF DRAWINGS

FIG. 4($a$) is a schematic top view of a state in which a driver, the traveling wave electrode Mach-Zehnder optical modulator, and a termination resistor are connected, and FIG. 4($b$) is a side view.

FIG. 11($a$) is a schematic top view of a state in which a driver and the traveling wave electrode Mach-Zehnder optical modulator according to the embodiment of the present disclosure are connected, and FIG. 11($b$) is a side view.

DESCRIPTION OF EMBODIMENTS

Hereinafter, embodiments of the present disclosure will be described in detail with reference to the drawings. The same or similar reference signs indicate the same or similar elements, and repeated description is omitted. Numerical values and material names in the following description are examples, and the disclosure of the present application is not limited thereto, and may be implemented with other numerical values and materials.

First Embodiment

Figure 2:
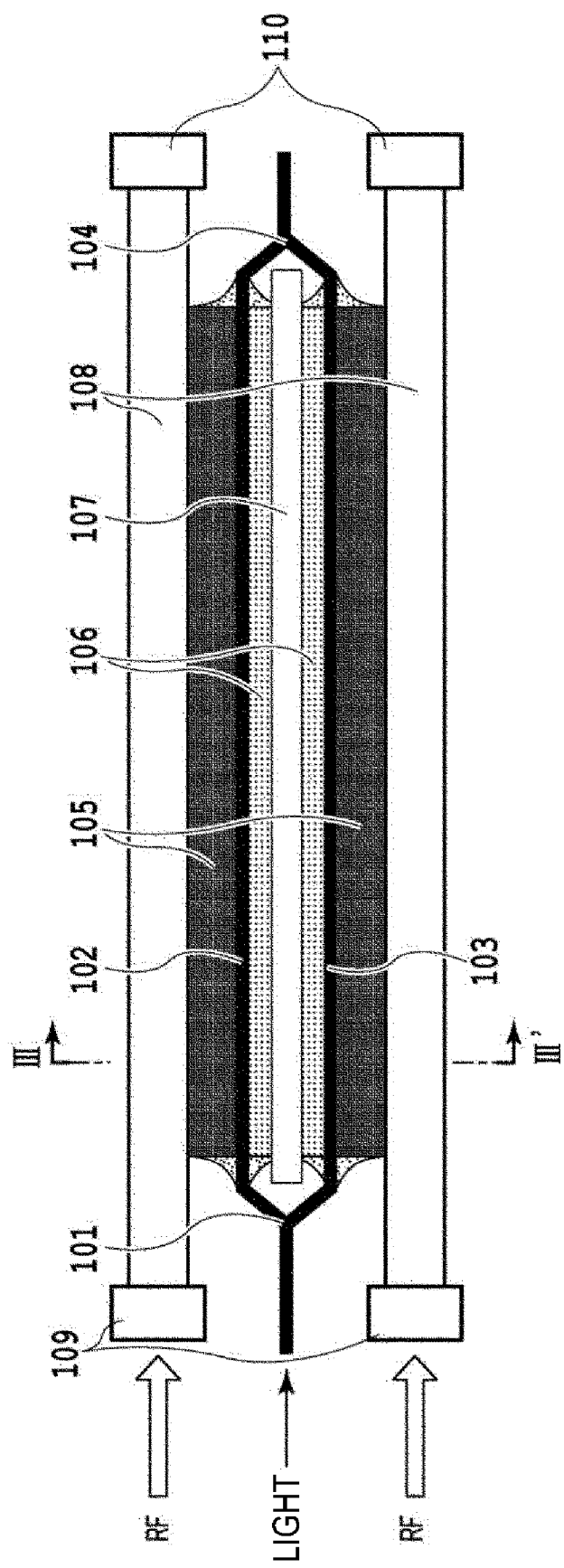
FIG. 2 is a schematic top view of a traveling wave electrode Mach-Zehnder optical modulator in the related art.
Figure 6:
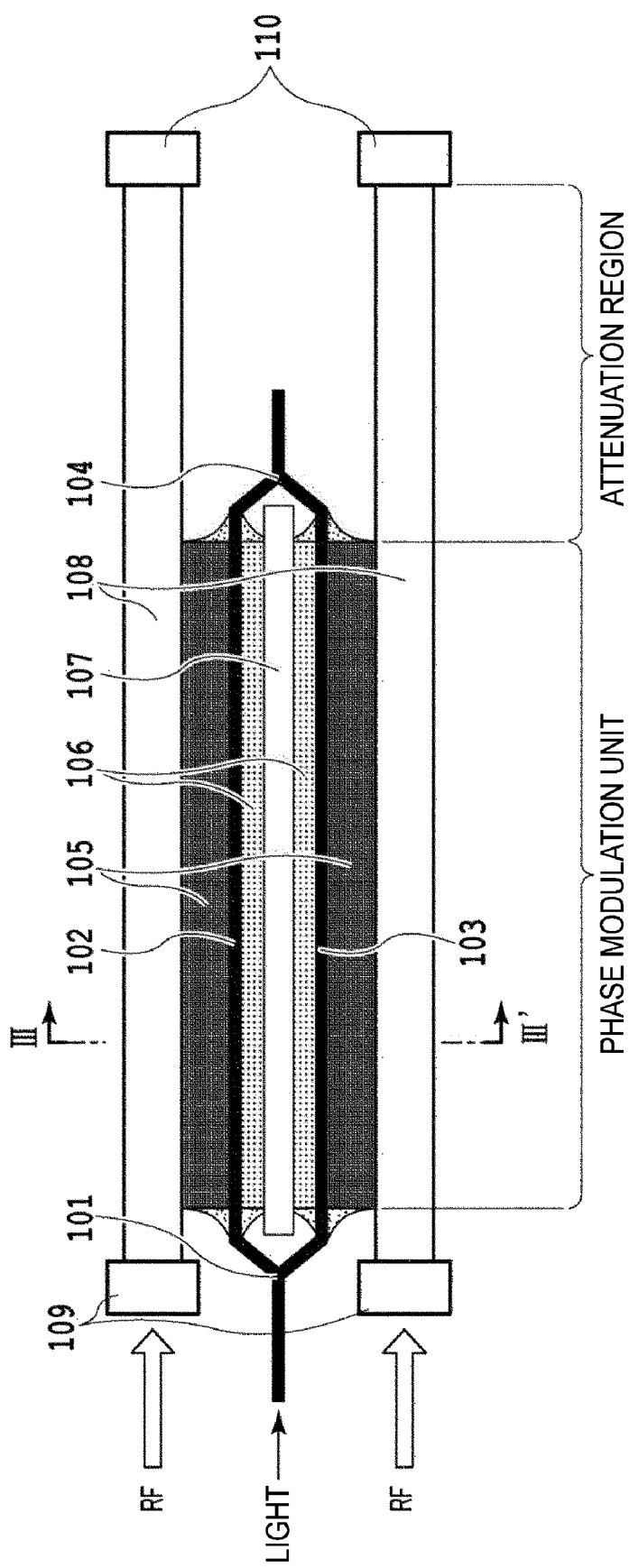
FIG. 6 is a schematic view of a traveling wave electrode Mach-Zehnder optical modulator according to an embodiment of the present disclosure.

FIG. 6 is a plan view illustrating a configuration of a Mach-Zehnder optical modulator according to a first embodiment of the present disclosure. The Mach-Zehnder optical modulator of the present embodiment has a configuration in which the configuration of the related-art Mach-Zehnder optical modulator illustrated in FIG. 2 is improved. The optical modulator illustrated in FIG. 6 includes an input optical coupler 101, a pair of parallel first and second waveguides 102 and 103 into which a wavelength is bifurcated by the input optical coupler 101 and which guide input light beams, and an output optical coupler 104 that couples output light beams. The input light is input via a linear waveguide or a bent waveguide connected to an input port of the input optical coupler 101, and is output via a linear waveguide or a bent waveguide connected to an output port of the output optical coupler 104.

Each of the waveguides 102 and 103 is a rib waveguide and is separated in the vertical direction of the paper into a region 105 having a first polarity and a region 106 having a second polarity. In FIG. 6, the region 106 having the second polarity of the phase modulation unit of each of the first waveguide 102 and the second waveguide 103 is formed in a region surrounded by the waveguides 102 and 103. On the other hand, the region having the first polarity of each of the waveguides 102 and 103 is formed opposite to the region 106 having the second polarity, with the light traveling direction of the corresponding phase modulation unit as an axis.

In the region 106 having the second polarity, a metal bias electrode 107 is provided. In each of the two regions 105 having the first polarity provided in the vertical direction of the paper, a traveling wave electrode 108 is provided. Typically, the traveling wave electrode 108 is provided with an input-side pad 109 for connecting an output signal from a driver for driving the modulator by wire bonding or the like. The traveling wave electrode 108 is also provided with an output-side pad 110 for impedance matching and for connecting with a termination resistor for terminating a radio frequency signal.

The difference from the related-art optical modulator illustrated in FIG. 2 is that, when compared with the phase modulation unit, each traveling wave electrode 108 of the optical modulator of FIG. 6 is formed longer than the phase modulation unit in the light propagation direction of the phase modulation unit.

The traveling wave electrode 108 typically has a characteristic of attenuating a propagating radio frequency wave. Thus, when the Mach-Zehnder optical modulator connected with the driver 50 and the termination resistor 51 in FIG. 4 is replaced with the Mach-Zehnder optical modulator of FIG. 6, multiple reflections between Rout and Rterm can be reduced. This can reduce ripples and increase the quality of transmitted signals.

Figure 7:
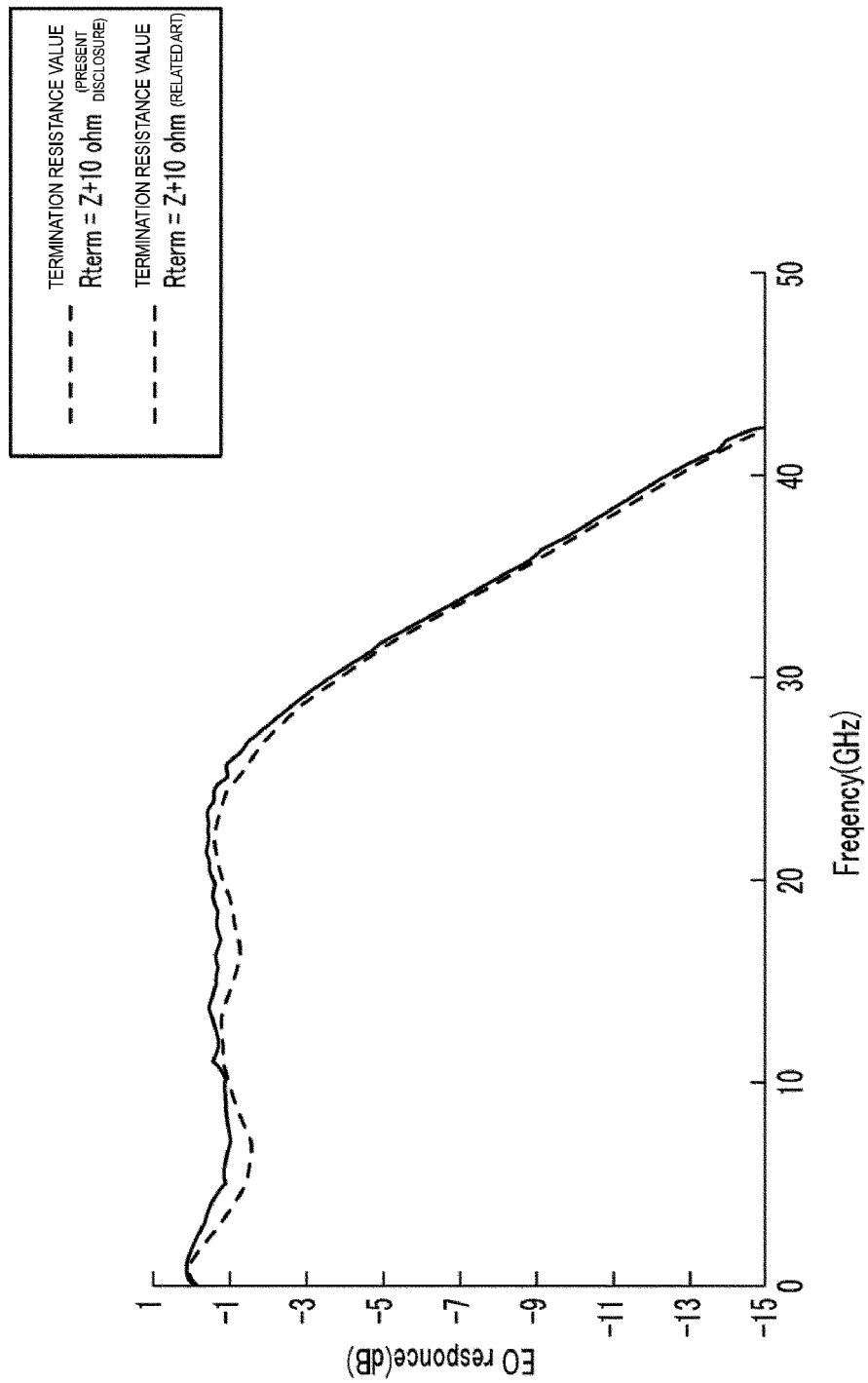
FIG. 7 shows EO characteristics of the traveling wave electrode Mach-Zehnder optical modulator according to the embodiment of the present disclosure.

FIG. 7 illustrates the EO (optical output) characteristics of the related-art optical modulator of FIG. 2 and the optical modulator of FIG. 6. In the optical modulator of FIG. 6, it can be seen that the amount of ripple can be reduced even when the value of Rterm is 10 ohm higher than Z. Note that FIG. 7 shows an example of calculation in a case in which the characteristics of each traveling wave electrode in a region (attenuation region) at a subsequent stage of the phase modulation unit have an attenuation of approximately 3 dB at 10 GHz.

Further, the attenuation region needs to be provided at a subsequent stage of the phase modulation unit in the light propagation direction of the phase modulation unit. Thus, a radio frequency electric modulation signal input from the driver through the input-side pad 109 propagates through the phase modulation unit to exert an optical modulation effect, and then the radio frequency signal is attenuated in the attenuation region and terminated in the termination resistor through the output-side pad 110. Thus, the optical modulator of the present embodiment can achieve an optical modulation effect equivalent to that of the optical modulator in the related art, reduce ripples and improve the quality of transmitted signals. When the attenuation region is provided at a preceding stage of the phase modulation unit in the light propagation direction of the phase modulation unit, the radio frequency electric modulation signal input from the driver through the input-side pad 109 is attenuated in the attenuation region and then propagates through the phase modulation unit to exert an optical modulation effect, which thus impairs the modulation performance.

Second Embodiment

In the traveling wave electrode 108 of the optical modulator illustrated in FIG. 6, the phase modulation unit and the attenuation region have the same shape, but the shape of the phase modulation unit may be different from that of the attenuation region. In general, when the phase modulation unit is loaded into the traveling wave electrode in the modulator (a PN junction is used as the phase modulation unit in the Si Mach-Zehnder modulator), the impedance decreases. Therefore, it is necessary to match the impedance between the phase modulation unit and the attenuation region.

Figure 8:
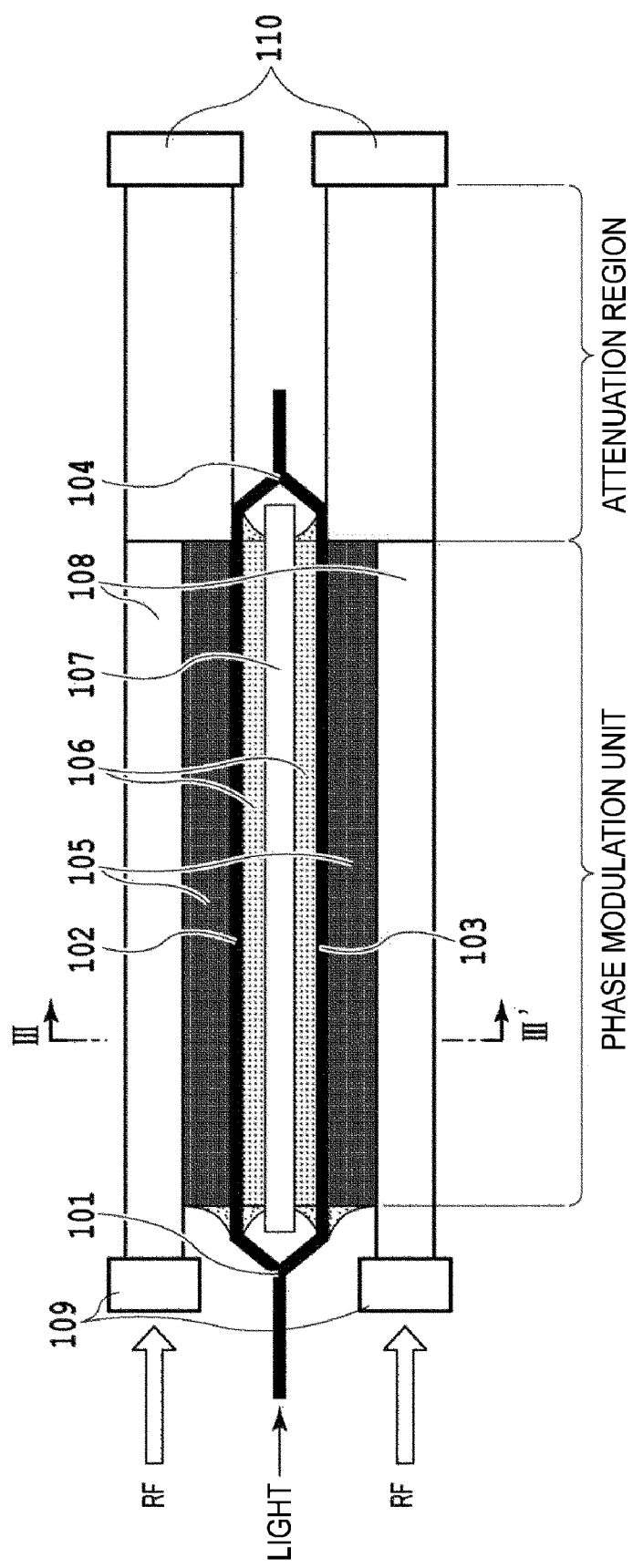
FIG. 8 is a schematic view of a traveling wave electrode Mach-Zehnder optical modulator according to an embodiment of the present disclosure.

FIG. 8 is a plan view illustrating a configuration of a Mach-Zehnder optical modulator according to a second embodiment of the present disclosure. The optical modulator of the present embodiment includes an input optical coupler 101, a pair of parallel first and second waveguides 102 and 103 into which a waveguide is bifurcated by the input optical coupler 101 and which guide input light beams, and an output optical coupler 104 that couples output light beams. Each of the waveguides 102 and 103 is a rib waveguide and is separated in the vertical direction of the paper into a region 105 having a first polarity and a region 106 having a second polarity. The input light is input via a linear waveguide or a bent waveguide connected to an input port of the input optical coupler 101. The input light is output via a linear waveguide or a bent waveguide connected to an output port of the output optical coupler 104. When compared with the phase modulation unit, each traveling wave electrode 108 is formed longer than the phase modulation unit in the light propagation direction of the phase modulation unit, to constitute an attenuation region. A metal bias electrode 107 is provided in the region 106 having the second polarity.

The Mach-Zehnder optical modulator of the present embodiment has a configuration that allows impedance matching between the phase modulation unit and the attenuation region.

As illustrated in FIG. 8, the attenuation region of the traveling wave electrode 108 has a width larger than that of the phase modulation unit. According to the optical modulator of the present embodiment, narrowing the spacing between the two traveling wave electrodes can reduce impedance, thereby achieving impedance matching between the phase modulation unit and the attenuation region.

Third Embodiment

Figure 9:
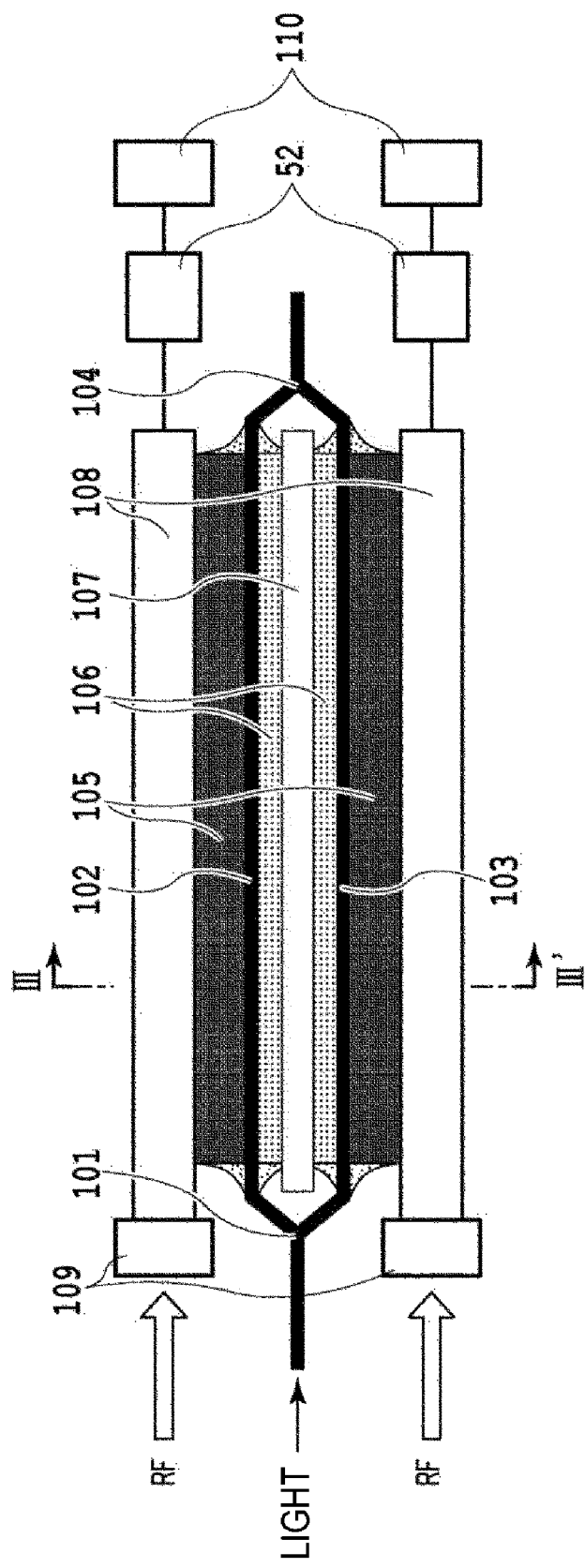
FIG. 9 is a schematic view of a traveling wave electrode Mach-Zehnder optical modulator according to an embodiment of the present disclosure.

FIG. 9 is a plan view illustrating a configuration of a Mach-Zehnder optical modulator according to a third embodiment of the present disclosure. The optical modulator of the present embodiment includes an input optical coupler 101, a pair of parallel first and second waveguides 102 and 103 into which a waveguide is bifurcated by the input optical coupler 101 and which guide input light beams, and an output optical coupler 104 that couples output light beams. Each of the waveguides 102 and 103 is a rib waveguide and is separated in the vertical direction of the paper into a region 105 having a first polarity and a region 106 having a second polarity. The input light is input via a linear waveguide or a bent waveguide connected to an input port of the input optical coupler 101. The input light is output via a linear waveguide or a bent waveguide connected to an output port of the output optical coupler 104. Each traveling wave electrode 108 is provided between the input optical coupler 101 and the output optical coupler 104 and forms a phase modulation unit. A metal bias electrode 107 is provided in the region 106 having the second polarity.

In the Mach-Zehnder optical modulators of the first and second embodiments, the traveling wave electrode constituting the phase modulation unit is extended to serve as the attenuation region having an attenuation effect, thereby achieving the effect of reducing the amount of ripple and improving the quality of transmission signals.

The Mach-Zehnder optical modulator according to the present embodiment has a configuration in which fixed attenuators 52 are installed between the traveling wave electrodes 108 and pads 110. An attenuation effect can be obtained by the fixed attenuators 52, without extending the traveling wave electrodes 108 constituting the phase modulation unit. As a result, the amount of ripple of the EO characteristics can be reduced.

Each fixed attenuator 52 can be installed by surface-mounting a small attenuator being a chip member on the modulator.

Fourth Embodiment

Figure 10:
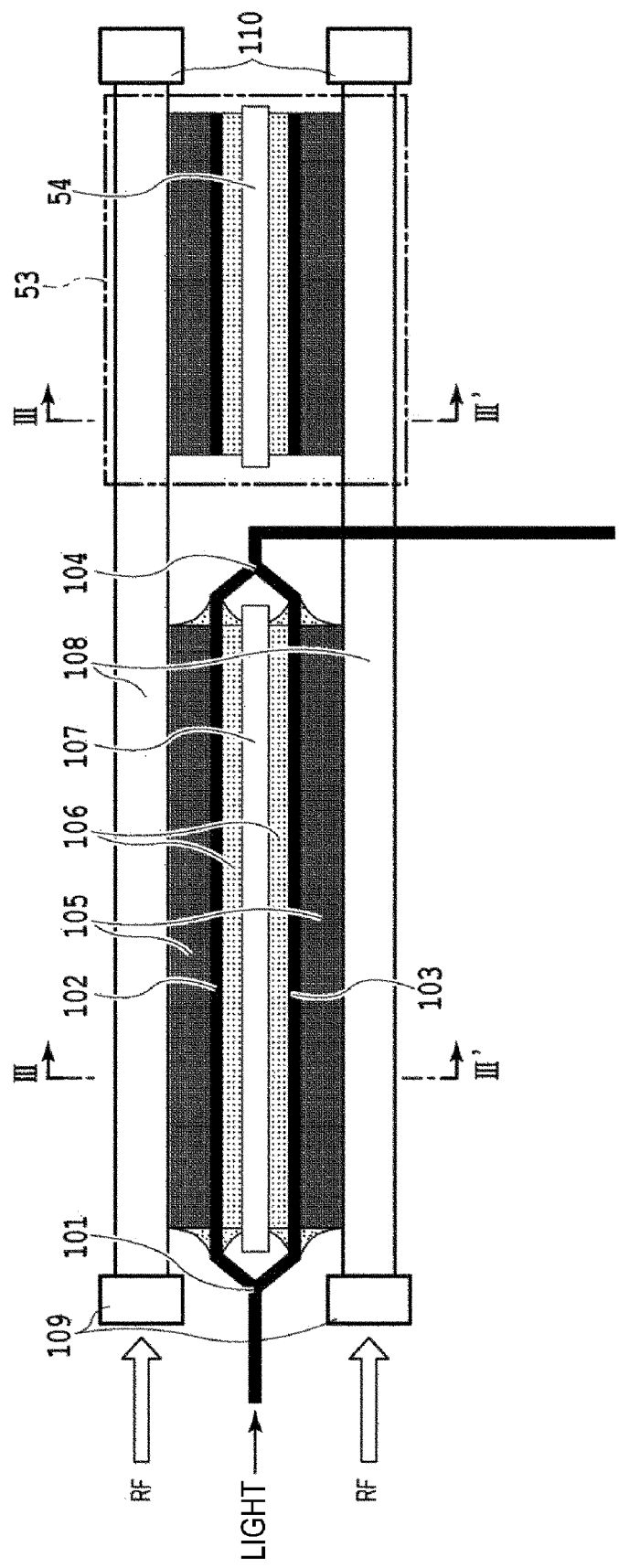
FIG. 10 is a schematic view of a traveling wave electrode Mach-Zehnder optical modulator according to an embodiment of the present disclosure.

FIG. 10 is a plan view illustrating a configuration of a Mach-Zehnder optical modulator according to a fourth embodiment of the present disclosure. The optical modulator of the present embodiment includes an input optical coupler 101, a pair of parallel first and second waveguides 102 and 103 into which a waveguide is bifurcated by the input optical coupler 101 and which guide input light beams, and an output optical coupler 104 that couples output light beams. The input light is input via a linear waveguide or a bent waveguide connected to an input port of the input optical coupler 101. The input light is output via a bent waveguide connected to an output port of the output optical coupler 104.

Each of the waveguides 102 and 103 is a rib waveguide and is separated in the vertical direction of the paper into a region 105 having a first polarity and a region 106 having a second polarity. When compared with the phase modulation unit, each traveling wave electrode 108 is formed longer than the phase modulation unit in the light propagation direction of the phase modulation unit. A metal bias electrode 107 is provided in the region 106 having the second polarity.

In the Mach-Zehnder optical modulator of the present embodiment, a fixed attenuator being a separate chip member is not installed, unlike the Mach-Zehnder optical modulator of FIG. 9, but a dummy phase modulation unit 53 formed monolithically on silicon photonics is provided. The dummy phase modulation unit 53 serves as a fixed attenuator having a large attenuation effect. The dummy phase modulation unit 53 formed monolithically on silicon photonics also includes a pair of two parallel waveguides, and traveling wave electrodes 108 formed longer than the phase modulation unit in the light propagation direction of the phase modulation unit. Here, the parallel waveguides are oriented in the light propagation direction of the first waveguide 102 and the second waveguide 103. Each of the pair of two parallel waveguides of the dummy phase modulation unit 53 is also a rib waveguide, and is separated into a region having a first polarity and a region having a second polarity. A metal bias electrode 54 is provided in the region having the second polarity.

Figure 3:
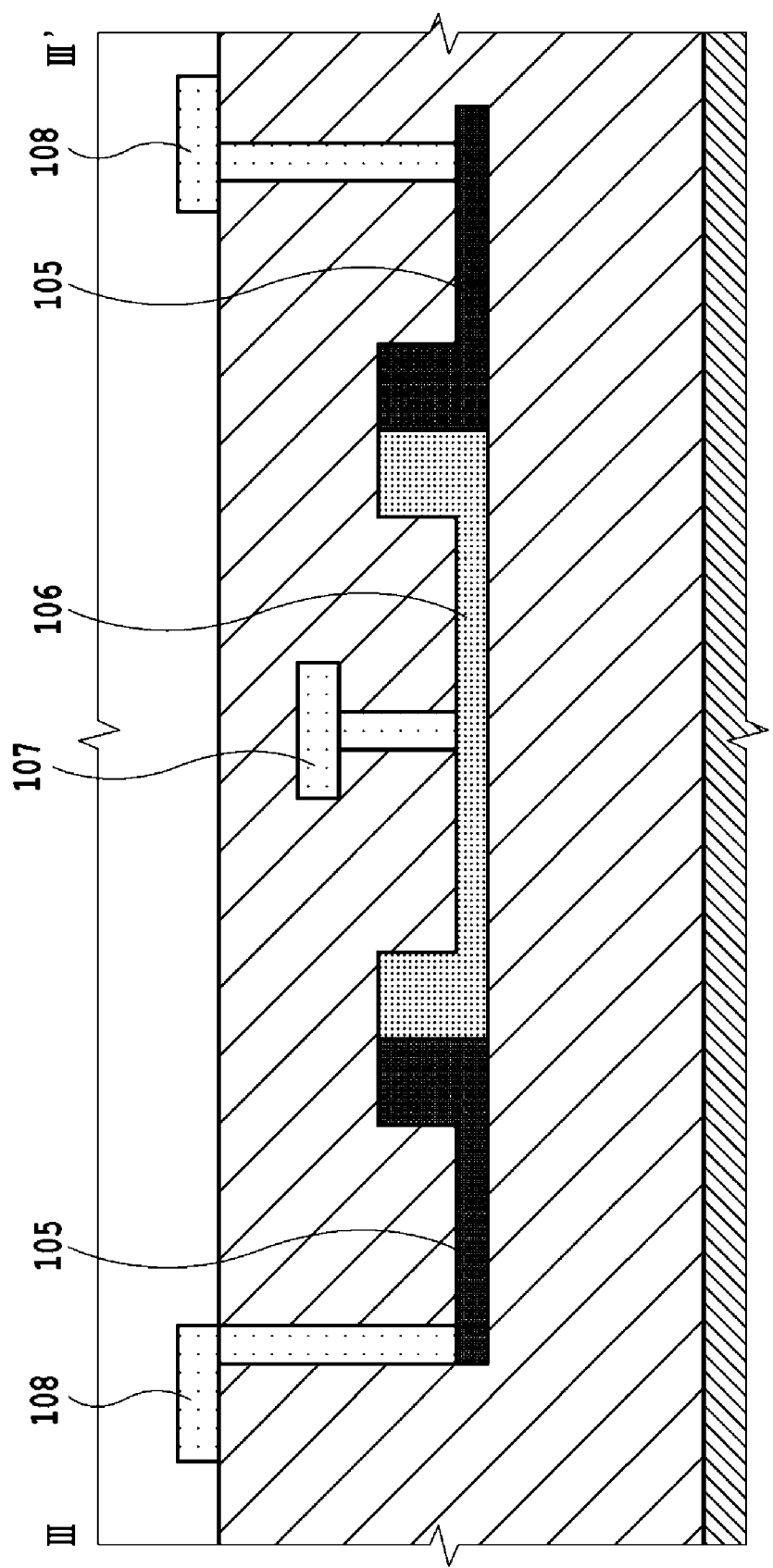
FIG. 3 is a schematic cross-sectional view of the traveling wave electrode Mach-Zehnder optical modulator in the related art.
Figure 5:
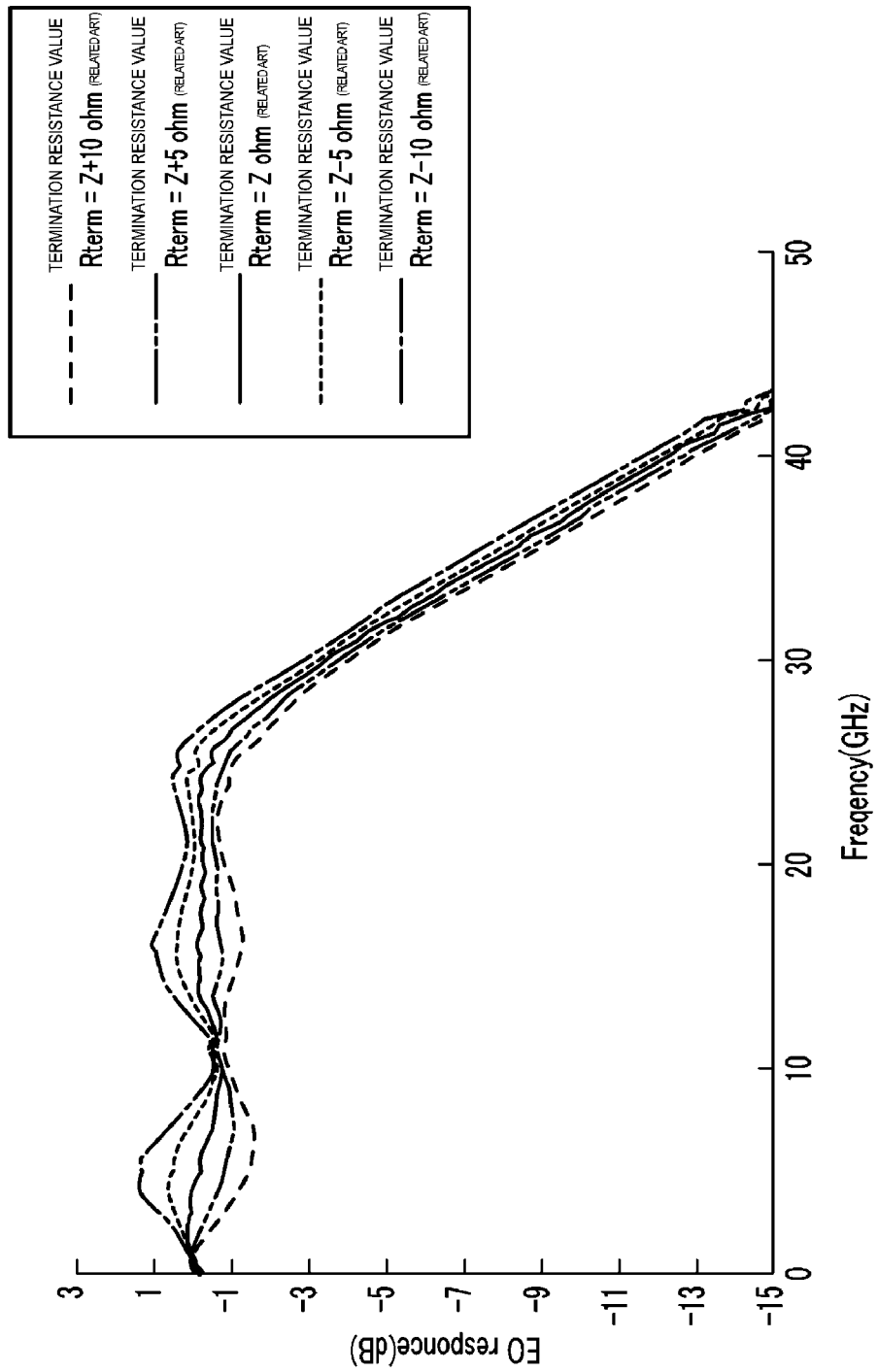
FIG. 5 shows EO characteristics when the traveling wave electrode Mach-Zehnder optical modulator in the related art is used.

The cross-sectional structure of the dummy phase modulation unit 53 is the same as that of the phase modulation unit illustrated in FIG. 3, but is not connected to an output unit of the Mach-Zehnder optical modulator. In general, a traveling wave electrode loaded with a PN junction can act as a fixed attenuator because attenuation characteristics increase during passage of a radio wave.

Unlike the Mach-Zehnder optical modulator illustrated in FIG. 9, the Mach-Zehnder optical modulator of the present embodiment does not have a configuration in which the bulk fixed attenuators 52 are installed between the traveling wave electrodes 108 and the pads 110. Thus, it is possible to reduce the cost by reducing the mounting cost and the number of parts. Further, when the doping concentrations of the region 105 having the first polarity and the region 106 having the second polarity of the dummy phase modulation unit 53 are greater than the doping concentrations of the region 105 having the first polarity and the region 106 having the second polarity of the phase modulation unit, the attenuation amount of the traveling wave electrode 108 connected to the dummy phase modulation unit 53 increases. This can reduce the amount of ripple while reducing the size.

Figure 1:
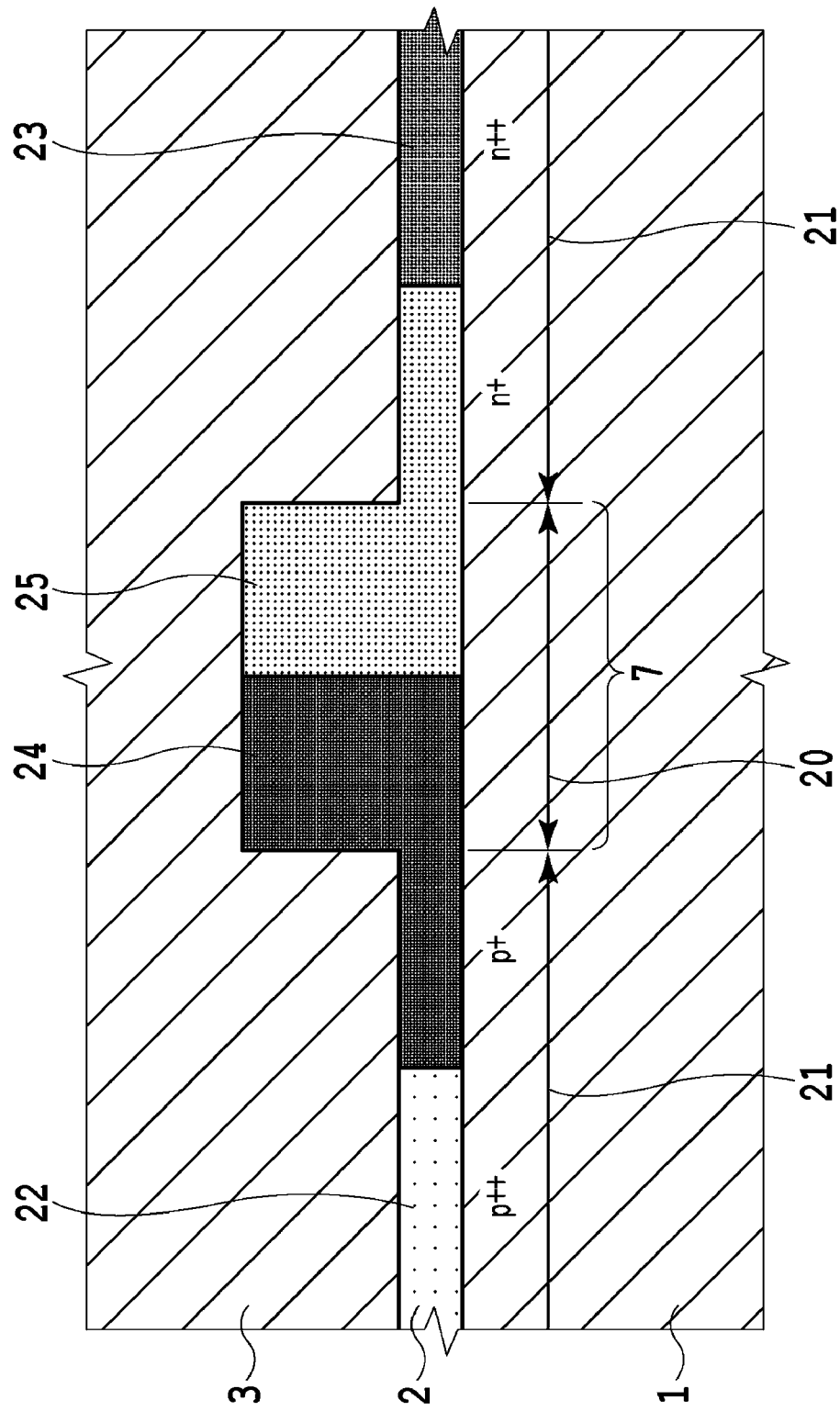
FIG. 1 is a cross-sectional view of a phase modulation unit of a Si Mach-Zehnder optical modulator.

As illustrated in FIG. 1, two or more doping concentrations are typically used in the phase modulation unit of the silicon modulator. In the dummy phase modulation unit 53 in FIG. 10, the optical waveguide core 20 and the slab regions 21 are formed as a PN junction using only a high-concentration p-type semiconductor layer (p++) and a high-concentration n-type semiconductor layer (n++), so that an attenuation effect can be more efficiently obtained. As described above with reference to FIG. 8, by adjusting the width and spacing of the traveling wave electrodes 108 in the dummy phase modulation unit 53, impedance matching between the phase modulation unit and the dummy phase modulation unit can be achieved. This makes it possible to transmit light with good signal quality without ripples.

FIG. 10 illustrates the configuration in which the bias electrode 54 is provided in the dummy phase modulation unit 53, but the bias electrode 54 may be omitted. In the case of the presence of the bias electrode 54, a change in a voltage for reverse-bias applied to the bias electrode 54 changes the depletion layer of the PN junction. This can change the attenuation amount and impedance in the dummy phase modulation unit 53. Generally, when the reverse bias is large, the depletion layer is greatly widened, which decreases the capacitance, and decreases the attenuation amount, but increases the impedance. When the dummy phase modulation unit 53 is provided, impedance mismatch between the phase modulation unit and the dummy phase modulation unit 53 causes reflection of radio waves, which may result in occurrence of ripples. When the bias electrode 54 is provided, the attenuation amount of the dummy phase modulation unit 53 can be controlled while the ripples that may be caused by the impedance mismatch between the phase modulation unit and the dummy phase modulation unit is being adjusted by biasing, so that it is possible to adjust the bias to minimize the ripple as a whole modulator.

Further, this effect makes it possible to adjust the impedance even when the impedance characteristics of the dummy phase modulation unit 53 vary after the Mach-Zehnder optical modulator is manufactured, so that the overall modulator can be adjusted such that the ripples are minimized.

Fifth Embodiment

FIG. 11 is a plan view illustrating a configuration of an optical transmitter according to a fifth embodiment of the present disclosure. The optical transmitter according to the present embodiment is an optical transmitter that uses the Mach-Zehnder optical modulator according to the fourth embodiment of the present disclosure described with reference to FIG. 10. The configuration of FIG. 11 differs from the connection configuration illustrated in FIG. 4 in which the traveling wave electrodes 108 (output-side pads 110) of the Mach-Zehnder optical modulator are connected to the terminal 516 (power supply potential) via the termination resistors 51. This configuration is characterized by connecting the traveling wave electrodes 108 of the Mach-Zehnder optical modulator of FIG. 10 to the terminal 516 (power supply potential) without termination resistors 51 interposed therebetween. Instead of the Mach-Zehnder optical modulator of FIG. 10, the Mach-Zehnder optical modulator of FIG. 8 or 9 may be used.

Generally, when no termination resistor is used, impedance mismatch at Rout, Z, and Rterm (in this case, depending on the impedance of the power supply, generally, several Kohm) results in large ripples in the radio frequency characteristics of the optical modulator.

However, in the method described below, the amount of ripple can be reduced even when there is a mismatch between the impedance of the power supply connected through the terminal 516 and the impedance of the traveling wave electrode 108, without using the termination resistors 51. Here, in the above-described method, any of the Mach-Zehnder optical modulators illustrated in FIGS. 8, 9 and 10 is used as the Mach-Zehnder optical modulator that constitutes the optical transmitter. Thus, because ripples can be reduced even when the termination resistor 51 is not used, the number of parts can be reduced and cost can be reduced without sacrificing signal quality of the optical transmitter. Further, by reducing the number of parts, an effect of improving product reliability of the optical transmitter and yield by mounting is also obtained.

REFERENCE SIGNS LIST 1, 3 SiO$_2$ Cladding layer
2 Si layer
7 Optical waveguide
20 Optical waveguide core 21 Slab region
22 High-concentration p-type semiconductor layer
23 High-concentration n-type semiconductor layer
24 Medium-concentration p-type semiconductor layer
25 Medium-concentration n-type semiconductor layer
101 Input optical coupler
102, 103 Waveguide (rib waveguide)
104 Output optical coupler
105 Region having first polarity
106 Region having second polarity
54, 107 Bias electrode
108 Traveling wave electrode
109, 501, 511 Input-side pad
110, 504, 513 Output-side pad
50 Driver
502, 503 Amplification circuit
505, 514 Wire
51 Termination resistor
512 Resistor
516 Terminal (potential)
52 Fixed attenuator
53 Dummy phase modulation unit

The invention claimed is:

1. An optical modulator formed on a substrate, the optical modulator comprising:
   at least one optical input;
   at least one optical output; and
   at least one phase modulation unit, wherein the phase modulation unit includes:
      optical waveguides having a PN junction structure, and
      traveling wave electrodes, each of the traveling wave electrodes being configured to allow a radio frequency signal for modulation to be applied thereto and interact with a light beam propagating through a corresponding one of the optical waveguides while the light beam is propagating in a same direction,
   the traveling wave electrodes are formed longer than the phase modulation unit in a light propagation direction of the phase modulation unit to constitute an attenuation region,
   the attenuation region is a dummy phase modulation unit, and
   the dummy phase modulation unit includes:
      portions of the traveling wave electrodes, the portions being obtained by forming the respective traveling wave electrodes longer than the phase modulation unit, and
      optical waveguides having a same PN junction structure as that of the optical waveguides of the phase modulation unit and not connected to the optical waveguides of the phase modulation unit.

2. The optical modulator according to claim 1, wherein
   a doping concentration of the optical waveguides of the dummy phase modulation unit is higher than a doping concentration of the optical waveguides of the phase modulation unit, and
   a loss of the radio frequency signal is large in the portions of the traveling wave electrodes constituting the attenuation region, the portions being obtained by forming the respective traveling wave electrodes longer than the phase modulation unit.

3. The optical modulator according to claim 2, wherein the dummy phase modulation unit further includes a bias electrode.

4. An optical transmitter comprising:
   the optical modulator according to claim 2, wherein a termination resistor is not connected to terminal end sides of the traveling wave electrodes.

5. The optical modulator according to claim 1, wherein the dummy phase modulation unit further includes a bias electrode.

6. An optical transmitter comprising:
   the optical modulator according to claim 5, wherein a termination resistor is not connected to terminal end sides of the traveling wave electrodes.

7. An optical transmitter comprising:
   the optical modulator according to claim 1, wherein a termination resistor is not connected to terminal end sides of the traveling wave electrodes.

* * * * *